(No Model.)
W. H. H. STEVENSON.
SHEET METAL CAN.
No. 262,143. Patented Aug. 1, 1882.
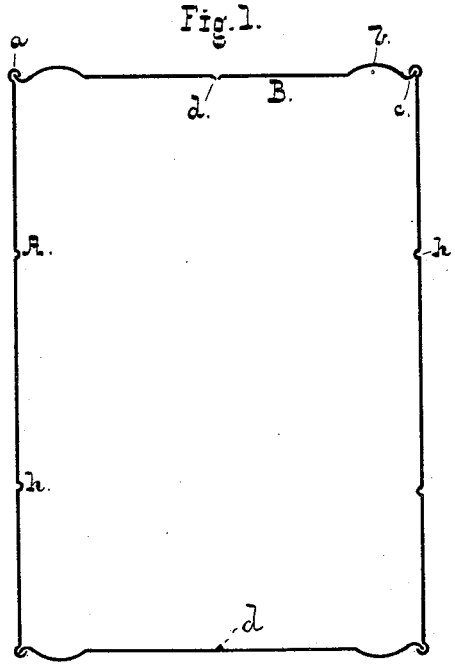
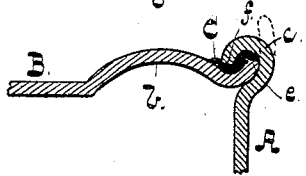
Witnesses
G. A. Gardner.
W. A. Butram.
Inventor
W. H. H. STEVENSON
by
Attorney

UNITED STATES PATENT OFFICE.

WILLIAM H. H. STEVENSON, OF BALTIMORE, MARYLAND.

SHEET-METAL CAN.

SPECIFICATION forming part of Letters Patent No. 262,143, dated August 1, 1882.

Application filed March 31, 1882. (No model.)

*To all whom it may concern:*

Be it known that I, WILLIAM H. H. STEVENSON, of Baltimore city, State of Maryland, have invented certain new and useful Improvements in Sheet-Metal Cans; and I hereby declare the same to be fully, clearly, and exactly described as follows, reference being had to the accompanying drawings, in which—

Figure 1 is a central vertical sectional view of the can; and Fig. 2 is a cross-section, on an enlarged scale, of the head-seam and adjacent parts.

My invention relates to sheet-metal cans, such as are used for containing provisions; and it has for its object, first, to increase the strength of the can and diminish the liability of bursting in the process-vats without any increase in the cost of manufacture over the methods heretofore employed; second, to do away with the conventional cap and prevent the collapsing of the walls of the can; and, third, to provide a can adapted to be soldered from the outside, and in being soldered to completely exclude the solder from the inside of the can and conceal and cover all the raw edges of the tin; and my invention consists in the features of construction hereinafter set forth and claimed, whereby the results above indicated are attained.

In the accompanying drawings, A is the body of the can, the blank for which is rolled up with a flare at each end, as shown in dotted lines, Fig. 2, and at the same operation one or more grooves, $h$, are rolled in the blank. The heads B are stamped up in suitable dies to the shape shown, an ogee-curve being formed in the edges of the heads, the swell $b$ being outward and that $c$ being inward. The extreme edges are turned upward, so as to form a little gutter, such as is formed around the cap-hole of the ordinary can.

In the center of the head or heads is formed an indentation, $d$, to serve as a step for the center-rod of an ordinary capping-iron.

In heading the can one of the heads is laid in place within the flared end of the body and a suitable die is brought down upon the end, turning the part $c$ over, as shown in Fig. 2, locking the head securely in place, the raw edges $e$ and $f$ being substantially horizontal and nearly in the same plane. The edge of the walls is turned over in a gentle curve, as shown, and is non-contiguous to the upturned edge of the head, the object being to prevent the bending of the tin so sharply as to cause it to break or crack, leaving the iron exposed on the outside. The joint is secured by solder C, which is applied by preference in the form of segment-wire, and is melted by means of a hot iron or flame. In case an iron is used, the operation is similar to that of capping. The can is placed upright, the center-rod of the iron is stepped in the indentation or vent, and the soldering-tool is then revolved about it, bearing on the joint and melting the solder. In case an annular iron is used, it is simply brought fairly down upon the joint and rotated slightly back and forth to spread the solder. The melted solder flows in the gutter, rising under the part $c$ until the same level substantially is attained inside and out, and the raw edges of the tin where the iron is exposed are covered. The solder does not enter between the head and walls into the interior of the can, because of the fact that the joint there is a close one and is at such distance from the iron as not to be heated sufficiently to keep the solder melted.

The cans are delivered to the packer with one head detached and the end flared. The detached head is provided with an indentation, $d$, which may be, and by preference is, a vent. The other head need not have either indentation or vent, unless the manufacturer chooses to use a center-rod iron for heading. The fruits, vegetables, or whatever the cans are to contain are placed in them, the head is laid in place, and the edge of the body is turned over, as already described. The can is headed finally by an operation precisely similar to the conventional capping.

A prejudice exists in the trade, and properly, too, against inside-soldered cans, by reason of the liability of certain acids in the contents of the cans to attack the lead of the solder, so that it is a desideratum to prevent, as far as possible, access of solder to the inside of the can. With the conventional cans, whether having flanged heads or having the body crimped over the edges of the heads, this can only be measurably attained, and a raw edge of the tin is exposed. Iron is even more readily attacked than lead by the fruit acids, but its salts, while not nearly so poisonous as those of lead, are apt to discolor the contents of the cans. By the peculiar joint I use, the solder is excluded from the interior of the can, the raw edges *e* and *f* are covered, and the can will not burst in the process-vat, at least not at the head-seams. After processing, by the very nature of the step, a partial vacuum is formed in the cans, and they are very liable to become indented or collapse at the sides. This I prevent by grooving the cans, as shown at *h*, whereby they are stiffened. These grooves are separated by spaces substantially the same as those between the grooves and the heads, whereby the walls are uniformly sustained. I do not mean by this to claim a corrugated can or sheet-metal vessel, as such a device is very old, being described, for instance, in British Letters Patent No. 1,059 of 1860. To corrugate a can is not my intention, nor would any useful result be thereby attained. The waste of metal would be enormous, the difficulty of soldering the side seam would be increased, and the continuity of surface necessary for attaching the label and for preventing it from being torn after attachment would be lost.

My invention in respect to the groove may be said to consist essentially in forming one or two entering-grooves in the can-body, sufficient to prevent collapse, while maintaining a substantially continuous surface to sustain the label. It is wholly immaterial, so far as appearance goes, how the grooves are arranged, for they are completely covered and concealed by the labels.

Having thus described my invention, what I claim as new, and desire to secure by Letters Patent, is—

1. A sheet-metal can having a gutter formed in the edge of its head, into which the edge of the walls is turned over in a curve non-contiguous to the upturned edge of the head, the raw edges of both walls and head lying in substantially the same horizontal plane and being covered by solder which secures the joint, as set forth.

2. A sheet-metal can having a series of indented grooves at substantially equal distances from each other and from the heads, whereby a practically continuous surface is afforded for the attachment of the label and the walls are sustained against collapse, as set forth.

WM. H. H. STEVENSON.

Witnesses:
R. P. SCOTT,
R. D. WILLIAMS.